Dec. 27, 1966   F. W. GUTZWILLER ETAL   3,295,054
SWITCHING CIRCUIT
Original Filed March 20, 1961   2 Sheets-Sheet 1

FRANK W. GUTZWILLER &
TAGE P. SYLVAN
BY James J. Williams, Attorney

Dec. 27, 1966   F. W. GUTZWILLER ETAL   3,295,054
SWITCHING CIRCUIT

Original Filed March 20, 1961   2 Sheets-Sheet 2

FRANK W. GUTZWILLER
& TAGE P. SYLVAN
BY James G. Williams,
Attorney

United States Patent Office 3,295,054
Patented Dec. 27, 1966

3,295,054
SWITCHING CIRCUIT
Frank W. Gutzwiller, Auburn, and Tage Peter Sylvan, Liverpool, N.Y., assignors to General Electric Company, a corporation of New York
Continuation of application Ser. No. 96,775, Mar. 20, 1961. This application Oct. 13, 1965, Ser. No. 518,495
23 Claims. (Cl. 323—22)

This is a continuation of application Ser. No. 96,775, filed March 20, 1961, now abandoned.

The invention relates to a switching circuit, and particularly to a switching circuit using solid-state devices for duplicating many of the functions of alternating current contactors.

Alternating current contactors, that is, contactors which provide a mechanical make and break of alternating current circuits, are used in many applications and for many purposes. Such applications and purposes include contactors for switching alternating currents to a load in a particular manner. For example, such contactors may provide a normally open circuit to a load which is closed in response to an operation, or may provide a normally closed circuit to a load which is opened in response to an operation, or may provide a latched condition, either normally open or normally closed, which is changed to the other condition in response to a momentary operation. The mechanical contactors which perform such functions are, of course, subject to the limitations of any mechanical device which must operate rapidly or which must operate many times.

Accordingly, an object of the invention is to provide a new and improved switching circuit which utilizes the solid-state devices in place of the mechanical contactors.

In addition to providing alternating current to a load, it is often desirable to supply direct current to a load from a source of alternating current. It is further desirable to supply such direct current in different modes, such as pointed out above. Therefore another object of the invention is to provide a switching circuit utilizing solid-state devices which can be connected in a number of configurations to supply direct current to a load from an alternating current source.

Briefly, these and other objects of the invention are achieved in a switching circuit utilizing controlled rectifiers and saturable reactors. The controlled rectifiers serve as a current path for the load, and are rendered conductive or nonconductive by the condition of the saturable reactors. The condition of the saturable reactors is controlled in a number of ways so as to provide a normally open circuit to the load, a normally closed circuit to the load, and a normally open or normally closed latched circuit to the load.

The subject matter of the invention is particularly pointed out and distinctly claimed in the concluding portion of this specification. The invention, however, both as to its arrangement and method of operation, together with additional objectives and advantages, may be better understood by reference to the following description taken in connection with the accompanying drawing. In the drawing:

Figure 7:
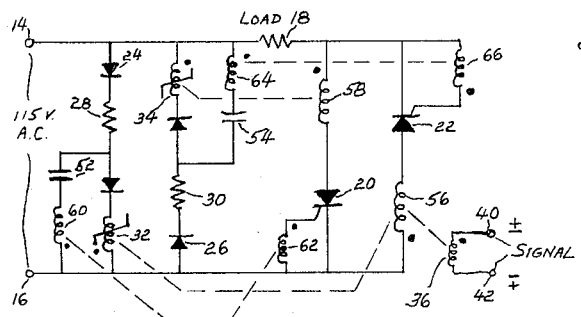
Figure 11:
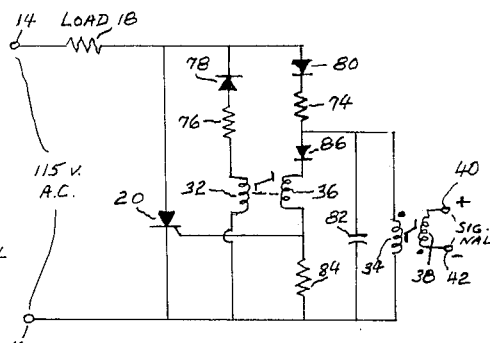
Figure 8:
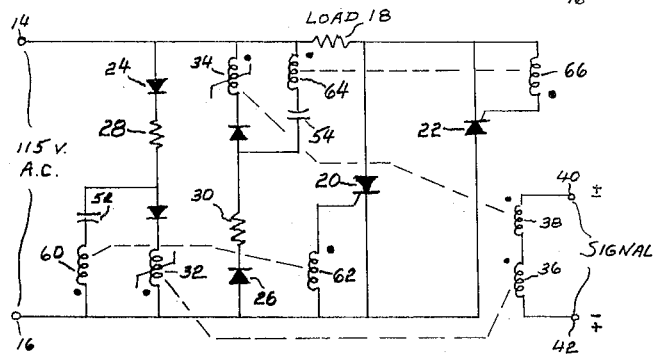
Figure 9:
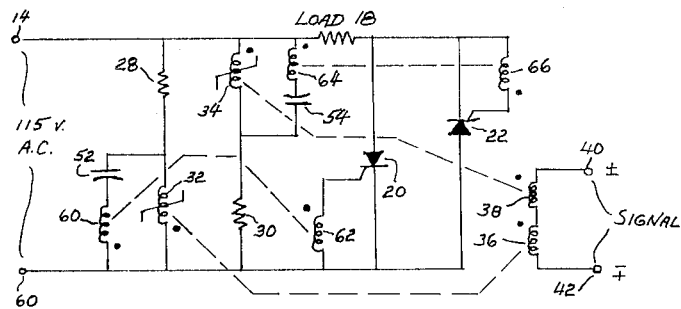
Figure 10:
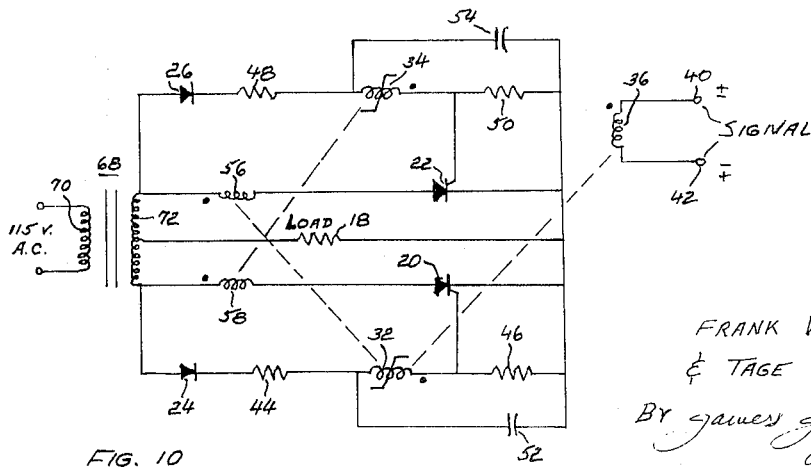

FIGURES 7, 8, and 9 show three embodiments respectively of circuits in accordance with the invention for supplying alternating current to a load, these circuits additionally using pulse transformers and respectively providing a latched circuit, a normally open circuit, and a normally closed circuit;

FIGURE 10 shows one embodiment of a circuit in accordance with the invention for supplying direct current to a load, this particular circuit being normally open; and FIGURE 11 shows one embodiment of a circuit in accordance with the invention for supplying alternating current to a load for a predetermined length of time.

Figure 1:
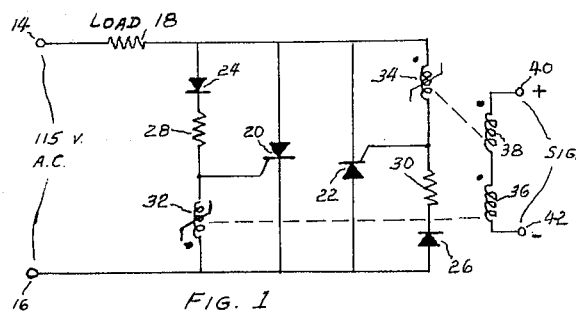
FIGURES 1 and 2 show two embodiments respectively of circuits in accordance with the invention for supplying alternating current to a load, these circuits being normally open.

In the figures, the same reference numerals are used throughout to designate similar or corresponding parts. With reference to FIGURE 1, there is shown a circuit for supplying alternating curent to a load, this circuit being normally open, but providing a closed path to a load upon the application and for the duration of an applied signal. In FIGURE 1, a source, such as ordinary 115-volt, 60-cycle alternating current, is provided at first and second source terminals 14, 16. A load 18 is connected at one end to the first source terminal 14, and is connected through the switching circuit in accordance with the invention to the second source terminal 16. The current paths for the load are provided by first and second controlled rectifiers 20, 22, such rectifiers being well known in the art. These rectifiers 20, 22 each have an anode, a cathode, and a gate electrode, and may be rendered conductive when the anode is suitably positive relative to the cathode and when a pulse of current is supplied to the gate electrode. Once conductive, the rectifier remains conductive even after the pulse of current is removed. The rectifier may be cut off by suitably lowering the positive voltage of the anode relative to the cathode. The controlled rectifiers 20, 22 are connected between the other end of the load 18 and the second source terminal 16 in an opposite polarity sense so that when the controlled rectifiers 20, 22 are conducting, the load 18 is connected across the source terminals 14, 16 for both polarities of the alternating current source. A first rectifier 24 is coupled in series with a resistor 28, and these elements are coupled between the anode and gate electrode of the first controlled rectifier 20 with the anode of the first rectifier 24 being coupled to the anode of the first controlled rectifier 20. Similarly, a second rectifier 26 and a resistor 30 are coupled between the anode and gate electrode of the second controlled rectifier 22. First and second saturable reactors having first and second secondary windings 32, 34 respectively and having first and second primary windings 36, 38 respectively are provided. These saturable reactors are known in the art, and have a magnetization characteristic such that after a certain amount of magnetizing force is provided to the reactor, no further magnetic flux is produced in response to additional magnetizing force. The first and second secondary windings 32, 34 are respectively coupled between the gate electrode and cathode of the first and second controlled rectifiers 20, 22 with the polarities as indicated by the dots adjacent the windings 32, 34. The first and second primary windings 36, 38 of the saturable reactors are coupled in series with the polarities indicated by the dots and are coupled to signal input terminals 40, 42 to which control or input signals are applied. The first primary and first secondary windings 32, 36 are coupled to the first saturable reactor as indicated by the dashed lines, and the second primary and second secondary windings 34, 38 are coupled to the second saturable reactor as indicated by the dashed lines.

In the absence of a signal applied to the signal input terminals 40, 42, the cores of the two saturable reactors will become saturated (in what is arbitrarily designated the forward direction) in response to respective currents which flow through the rectifiers 24, 26, the resistors 28, 30 and the secondary windings 32, 34. Saturation in the other direction (arbitrarily designated resetting) of the saturable reactors is prevented during respective alternate half cycles by the first and second rectifiers 24, 26. Once the saturable reactors have become saturated in the forward direction, the first and second secondary windings 32, 34 have a low impedance and will not sustain a positive voltage between the gate electrodes and cathodes of the first and second controlled rectifiers 20, 22 respectively. Thus, currents which flow through the rectifiers 24, 26 and the resistors 28, 30 are shunted away from the gate electrodes by the secondary windings 32, 34. Hence, the controlled rectifiers 20, 22 do not conduct and appear as an open circuit so that the load 18 receives no current. However, upon the application of a unidirectional signal to the signal input terminals 40, 42 so that the upper input terminal 40 is positive with respect to the lower input terminal 42, current flows through the primary windings 36, 38 in a direction which tends to reset (i.e., saturable the reactors in the opposite direction) the saturable reactors as indicated by the dots adjacent the windings. If the reactors are thus reset, the secondary windings 32, 34 will, upon the next appropriate half cycle of current, present a sufficiently high impedance to cause a positive voltage to appear at their respective gate electrodes. (However, the same voltage also appears across the secondary windings 32, 34 so that the saturable reactors do become saturated in the forward direction.) Thus, the controlled rectifiers 20, 22 will fire and conduct current through the load 18 during their respective appropriate half cycles. This will continue as long as the input signal is applied to the signal input terminals 40, 42 in the manner described to reset the saturable reactors. Upon removal of this signal, the saturable reactors will become and remain saturated in the former condition so that insufficient voltage is applied to the gate electrodes and the controlled rectifiers 20, 22 are turned off because of the respective reverse voltages applied to their anodes and cathodes. Thus current to the load 18 is removed. The size of the saturable reactors and their windings must be large enough to permit the secondary windings 32, 34 of the reactors to supply the gate electrode voltage required to fire or render conductive the controlled rectifiers 20, 22.

Figure 2:
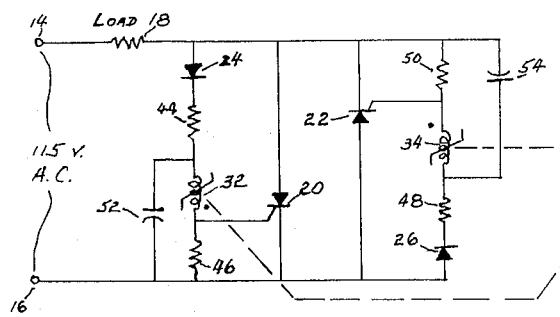

FIGURE 2 shows another circuit which performs the same function as FIGURE 1, namely provides a normally open circuit to a load and provides a closed circuit in response to and for the duration of an applied signal. The only difference between the circuit of FIGURE 2 and the circuit of FIGURE 1 is the manner of coupling the secondary windings 32, 34 to the respective gate electrodes of the controlled rectifiers 20, 22. The first secondary winding 32 is coupled in a series circuit comprising the first rectifier 24, a resistor 44, the first secondary winding 32, and a resistor 46. The first secondary winding 32 has the polarity indicated. A first capacitor 52 is coupled across the secondary winding 32 and the resistor 46. Similarly, the second secondary winding 34 is coupled in a series circuit comprising the second rectifier 26, a resistor 48, the secondary winding 34, and a resistor 50. A second capacitor 54 is coupled across the secondary winding 34 and the resistor 50. If no signal voltage is applied to the signal input terminals 40, 42, the saturable reactors become saturated in the forward direction by currents through their respective secondary windings 32, 34. The values of the resistors 46, 50 are such that insufficient voltages in response to these currents are developed across the resistors 46, 50 respectively and thus the first and second controlled rectifiers 20, 22 are prevented from firing. However, upon application of a unidirectional signal such that the upper input terminal 40 is positive with respect to the lower input terminal 42, the saturable reactors are reset, and during the next appropriate half cycles, the first and second secondary windings 32, 34 present a sufficiently high impedance so as to divert current into the respective first and second capacitors 52, 54. These capacitors 52, 54 begin to charge, and at the same time voltages across the secondary windings 32, 34 begin to saturate the saturable reactors in the forward direction. This lowers the impedance of the secondray windings 32, 34. Once the capacitors 52, 54 receive sufficient charge, and once the saturable reactors are sufficiently saturated in the forward direction, the capacitors 52, 54 respectively discharge through their respective secondary windings 32, 34 and through the gate electrode-cathode circuits of the controlled rectifiers 20, 22 to thus fire the controlled rectifiers 20, 22. Upon removal of the signal from the input terminals 40, 42 the saturable reactors are saturated in the forward direction during the next appropriate half cycles and the controlled rectifiers 20, 22 are turned off. With respect to FIGURE 2, the resistors 44, 48 do not have to supply the required gate electrode firing current as is the case of the resistors 28, 30 in FIGURE 1. Thus, the values of the resistors 44, 48 can be larger. Since these resistors 44, 48 determine the magnitude of the open circuit impedance of the switching circuit of FIGURE 2, permits a larger open circuit impedance than does the circuit of FIGURE 1. Also, the circuit of FIGURE 2 permits a higher value of impedance for the load 18.

Figure 3:
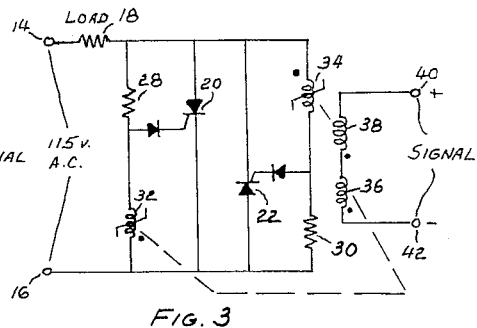
FIGURES 3 and 4 show two embodiments respectively of circuits in accordance with the invention for supplying alternating current to a load, these circuits being normally closed.

In some applications, it is desirable to supply a load with an alternating current source at all times, except upon application of a signal. FIGURE 3 shows a normally closed circuit arrangement in accordance with the invention which supplies current except during the application of a control signal. In FIGURE 3, it will be noted that the circuit is similar to that circuit shown in FIGURE 1 except the first and second rectifiers 24, 26 have been replaced by a direct connection. Also, rectifiers may be respectively connected in series with the gate electrodes to prevent exceeding the reverse voltage rating of the gate electrodes. However, these rectifiers are not absolutely essential. In the absence of any signal applied to the signal input terminals 40, 42, the saturable reactors are saturated in the forward direction and then reset by the voltage across the secondary windings 32, 34 during each of the appropriate half cycles respectively. Thus, during the half cycle when the first source terminal 14 is positive with respect to the second source terminal 16, the first secondary winding 32 presents sufficiently high impedance to cause the first controlled rectifier 20 to fire. During this same half cycle, current flows through the second secondary winding 34 to reset the second saturable reactor. During the next half cycle, the reverse takes place so that the second controlled rectifier 22 is fired and the first secondary winding 32 is reset. Upon the application of a unidirectional signal to the terminals such that the upper input terminal 40 is positive with respect to the lower input terminal 42, the saturable reactors are both saturated in the forward direction so that the secondary windings 32, 34 present insufficient impedance to fire the controlled rectifiers 20, 22.

Figure 4:
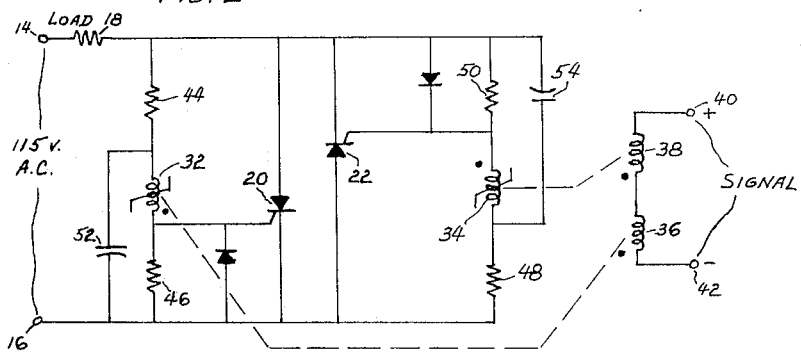

FIGURE 4 shows another embodiment of a circuit which provides a normally closed circuit to a load except during the application of an appropriate input signal. FIGURE 4 is substantially similar to FIGURE 2 except that again the first and second rectifiers 24, 26 have been replaced with a direct connection, and rectifiers are shown between the gate electrodes and cathodes of the first and second controlled rectifiers 20, 22 respectively. These additional rectifiers are to prevent excess reverse voltages being applied, but are not essential. In the absence of a signal at the signal input terminals 40, 42, the circuit of FIGURE 4 functions in the same manner as the circuit of FIGURE 2. Resetting of the saturable reactors is provided in the same manner described in connection with the circuit of FIGURE 3 so that the capacitors 52, 54 receive a charge, and the saturable reactors become saturated in the forward direction to permit the capacitors 52, 54 to discharge and fire the controlled rectifiers 20, 22 during respective half cycles. Upon the application of a unidirectional signal such that the upper input terminal 40 is positive with respect to the lower input terminal 42, the saturable reactors are saturated in the forward direction so that the capacitors cannot become charged and fire the controlled rectifiers 20, 22. The impedance advantages of the circuit shown in FIGURE 2 are also present in the circuit shown in FIGURE 4.

Persons skilled in the art will appreciate that the circuits shown in FIGURES 1 through 4 can be combined to duplicate various relay functions. For example, a single pole-double throw relay function can be obtained by combining a circuit which is normally open (such as shown in FIGURE 1) with a circuit which is normally closed (such as shown in FIGURE 3) and connecting their signal input terminals in series or parallel.

Figure 5:
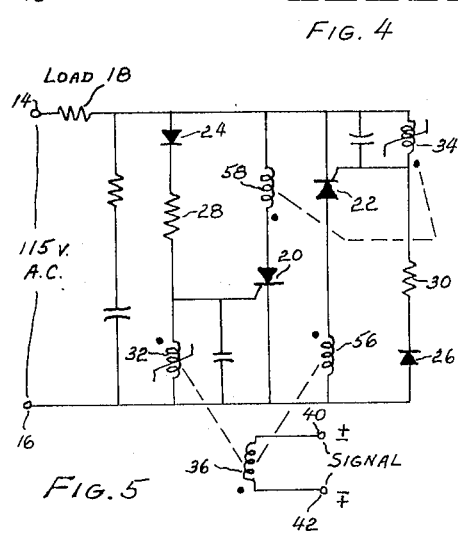
FIGURES 5 and 6 show two embodiments respectively of latching circuits in accordance with the invention for supplying alternating curent to a load, these latching circuits being capable of being either normally open or normally closed.

In some switching applications, it is desirable to provide a latching or latched operation. That is, it is desirable that a load be continuously connected or disconnected to or from a source in response to the appropriate and momentary application of a signal. FIGURE 5 shows a circuit in accordance with the invention for providing this function. FIGURE 5 is similar to the circuit shown in FIGURE 1, but additional first and second feedback windings 56, 58, which are coupled to the first and second reactors respectively, have been serially connected in the anode-cathode circuits of the controlled rectifiers 20, 22 respectively. These windings are coupled to the first and second saturable reactors respectively as are the secondary windings 32, 34. In the circuit of FIGURE 5, only one primary winding is necessary for control of the circuit, and the first primary winding 36 has been arbitrarily selected. To provide a latched closed circuit, a unidirectional signal is applied such that the upper input terminal 40 is positive with respect to the lower input terminal 42. This signal resets the first saturable reactor so that during the next appropriate half cycle, the first secondary winding 32 presents sufficient impedance such that the first controlled rectifier 20 fires. When the first controlled rectifier 20 fires, current through the second feedback winding 58 resets the second saturable reactor. At this point, the input signal may be removed from the input terminals 40, 42. During the next half cycle, and with the second saturable reactor reset, the second controlled rectifier 22 fires, and current then flows through the first feedback winding 56 to reset the first saturable reactor. Thus, the firing of the first controlled rectifier resets the second saturable reactor to permit the second controlled rectifier to fire and reset the first saturable reactor. Thus, the load 18 is substantially continuously supplied with current. When it is desired to open the circuit to load 18, a unidirectional signal is applied such that the lower input terminal 42 is positive with respect to the upper input terminal 40. Such a signal saturates the first saturable reactor in the forward direction so that the first secondary winding 32 presents a low impedance and the first controlled rectifier 20 fails to fire during the next appropriate half cycle. Failure of the first controlled rectifier 20 to fire results in the second saturable reactor not resetting and so that the second controlled rectifier 22 does not fire. At this point, the input signal may be removed. The saturable reactors are both left in a forward saturated condition and the circuit remains open in a latched condition. In FIGURE 5, a capacitor may be connected between the gate electrode and cathode of each of the controlled rectifiers 20, 22 to provide filtering of line transients. Likewise, a resistor and capacitor may be coupled across the firing circuits to provide additional filtering of transients, and thereby improve reliability of the circuit by supplying energy to reset the core if the source voltage is momentarily interrupted during the resetting operation.

Figure 6:
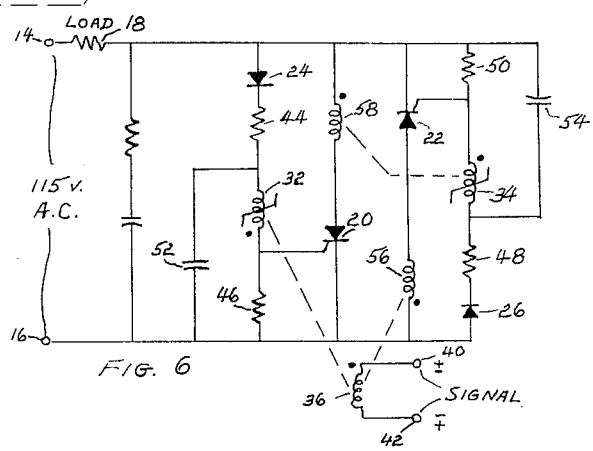

FIGURE 6 shows a latched or latching type circuit similar to the circuit shown in FIGURE 5. The only difference between the circuit of FIGURE 6 and that of FIGURE 5 lies in the use of the first and second capacitors 52, 54 for supplying the firing current pulse to the gate electrodes of the first and second controlled rectifiers 20, 22. This operation has been described with relation to FIGURE 2. The circuit of FIGURE 6 will remain in the latched condition, either open or closed, in response to the momentary application of the appropriate signal applied to the signal input terminals 40, 42 as explained in connection with FIGURE 5.

FIGURES 7, 8, and 9 show circuit embodiments of the invention utilizing pulse transformers for controlling the operation of the first and second controlled rectifiers 20, 22. The function of these pulse transformers is provided by the secondary windings 32, 34 of the saturable reactors as shown in FIGURE 1 and is provided by the capacitors 52, 54 as shown in FIGURE 2. In FIGURE 7, there is shown a circuit which provides the latching or latched operation previously mentioned. A first pulse transformer having a primary winding 60 and a secondary or gating winding 62 is utilized to control firing of the first controlled rectifier 20, and a second pulse transformer having a primary winding 64 and a secondary or gating winding 66 is provided for controlling the firing of the second controlled rectifier 22. The primary winding 60 of the first pulse transformer is coupled in series with the capacitor 52 and this circuit is coupled across the secondary winding 32 of the first saturable reactor. This secondary winding 32 is coupled in series with the first rectifier 24 and the resistor 28. The secondary winding 62 of the first pulse transformer is coupled between the gate electrode and cathode of the first controlled rectifier 20. A similar circuit is provided using the second pulse transformer windings 64, 66 for the second controlled rectifier 22. If latched operation in the closed circuit condition is desired, a unidirectional signal is applied to the primary winding of one of the saturable reactors, such as the primary winding 36 of the first saturable reactor, to reset the first saturable reactor. During the next appropriate half cycle, the first capacitor 52 is charged, and at the same time the first saturable reactor begins to become saturated in the forward direction. When the first saturable reactor becomes sufficiently saturated, the first capacitor 52 discharges through the secondary winding 32 of the first saturable reactor and through the primary winding 60 of the first pulse transformer. The pulse of current through this primary winding 60 provides a firing pulse through its secondary winding 62 to fire the first controlled rectifier 20. Upon the firing of the first controlled rectifier 20, current flows through the feedback winding 58 of the second saturable reactor to reset the second saturable reactor. During the next half cycle, the same function take place with respect to the second controlled rectifier 22, and then operation continues in the manner previously described. The circuit may be latched in the open condition by applying the opposite polarities of a unidirectional potential to the signal input terminals 40, 42, this operation also having been described in connection with FIGURES 5 and 6. The advantage of the pulse transformers shown in FIGURE 7 lies in the isolation provided, and in enabling the load 18 to be isolated from operation of the control. Thus, no current flows through the load in the off condition. In FIGURE 7, rectifiers are provided between the resistor 28 and the secondary winding 32 and between the resistor 30 and the secondary winding 34 for the purpose of preventing oscillatory currents from flowing in pulse transformer primary windings and the saturable reactor secondary windings due to resonant effects of the capacitances in conjunction with the winding inductances.

FIGURES 8 and 9 show circuit embodiments utilizing the pulse transformers mentioned in FIGURE 7. FIGURE 8 shows a circuit arrangement which provides a normally open circuit for the load 18 except during application of a proper unidirectional signal to the signal input terminals 40, 42. FIGURE 9 shows a circuit which provides a normally closed circuit for the load 18 except upon application of a proper unidirectional signal to the signal input terminals 40, 42. With the explanation of the pulse transformers given in FIGURE 7 and with the explanation of the normally open circuit of FIGURE 2 and the normally closed circuit of FIGURE 4, the operation of the circuits in FIGURES 8 and 9 will be clear.

The preceding nine circuits all illustrate embodiments of the invention which provide switching of alternating current to a load in various modes. FIGURE 10 shows a circuit in accordance with the invention which provides switching of direct current to a load. It is to be understood that while FIGURE 10 shows only one embodiment for switching direct current to a load, various embodiments employing the previous circuits may be used to switch direct current. In FIGURE 10, there has been illustratively shown a circuit for switching direct current that provides latching operation in accordance with the operation described in FIGURE 6. The circuit of FIGURE 10 provides full wave rectification of an alternating current source supplied to a transformer 68 having a primary winding 70 and a secondary winding 72. The ends of the secondary winding 72 are respectively coupled to the controlled rectifiers 20, 22 and their associated control circuitry. The center tap of the secondary winding 72 is coupled through the load 18 to the other ends of the controlled rectifiers 20, 22 and associated circuitry. Upon application of a unidirectional signal to a primary winding, arbitrarily selected as the first primary winding 36, such that the upper terminal 40 is positive with respect to the lower terminal 42, the first saturable reactor is reset and during the next appropriate half cycle the first controlled rectifier 20 fires. This firing supplies current to the load 18 of the polarity indicated, and also supplies current through the second feedback winding 58. This current through the second feedback winding 58 resets the second saturable reactor so that the second controlled rectifier 22 fires during the next half cycle and supplies current to the load 18 and to the first feedback winding 56. This operation continues until a unidirectional signal is applied to the signal input terminals 40, 42 to saturate the saturable reactors in the forward direction. While only one embodiment of the switching circuit for applying direct current to a load has been illustrated, it is again emphasized that any of the preceding circuits can be utilized to switch direct current to a load by connecting the circuits to the load in a manner similar to that illustrated in FIGURE 10.

FIGURE 11 shows a switching circuit in accordance with the invention for switching current to a load for a predetermined length of time, and specifically for a predetermined number of cycles after an initiating pulse. In the circuit of FIGURE 11, the load 18 is coupled from the first source terminal 14 through the controlled rectifier 20 to the second source terminal 16. A series circuit comprising the secondary winding 32 of the first saturable reactor, a resistor 76, and a rectifier 78 are coupled in parallel with the anode and cathode of the first controlled rectifier 20. The primary winding 36 of the first saturable reactor is coupled in series with two rectifiers 80, 86 and two resistors 74, 84. One end of the primary winding 36 of the first reactor is also coupled to the gate electrode of the first controlled rectifier 20. The junction of the resistor 74 and the rectifier 86 is coupled to one end of the secondary winding 34 of the second saturable reactor and the other end of the secondary winding 34 is coupled to the second source terminal 16. A timing capacitor 82 is coupled in parallel with this secondary winding 34. The signal input terminals 40, 42 are coupled to the primary winding 38 of the second reactor. An examination of FIGURE 11 will show that if the second saturable reactor is not considered, a normally closed circuit is provided to the load 18. Thus, during the half cycles when the first source terminal 14 is positive with respect to the second source terminal 16, the timing capacitor 82 receives a charge, and after the first reactor becomes saturated as a result of the voltage across its primary winding 36, the capacitor 82 discharges through the rectifier 86 and the primary winding 36 to the gate electrode to fire the controlled rectifier 20. During the next half cycle, the controlled rectifier 20 is turned off by the reverse polarities and the first saturable reactor is reset by current which flows upward through the secondary winding 32, the resistor 76, and the rectifier 78, and the load 18. Generally, this current through the load 18 is sufficiently small to be ignored. With the first saturable reactor thus reset, the controlled rectifier 20 may again be fired in the next half cycle as previously described. The secondary winding 34 in parallel with the capacitor 82 serves as a variable shunt impedance to control the amount of charge which the capacitor 82 may receive. If a large unidirectional signal is applied to make the upper input terminal 40 positive with respect to the lower input terminal 42, the second reactor is reset a correspondingly large amount so that there is a large shunt impedance in parallel with the capacitor 82. Thus, when the source terminal 14 is positive, the capacitor will charge and supply firing pulses to the controlled rectifier 20 for a number of cycles in the same manner as discussed in FIGURE 2. The number of cycles that operation will occur is a function of the degree of reset of the second saturable reactor. Once the second saturable reactor becomes saturated from the repeated application of voltage to the capacitor 82, the impedance of the winding 34 decreases to a low value that shunts capacitor 82 and prevents further firing of controlled rectifier 20. Such a circuit has many applications, one example being a welding control for controlling the time of current applied to a welder. Other applications will occur to persons skilled in the art. Likewise, persons skilled in the art will appreciate that the previous circuits illustrated and explained may be used for the same time control function as illustrated in the circuit of FIGURE 11.

Although the invention has been described in specific embodiments and the operation has been explained in what is considered to be the best modes of operation, it is to be understood that other arrangements, such as utilization of other devices than the controlled rectifiers, may be used. The embodiments shown and described are merely illustrative, and the invention is not limited to such embodiments or their operation since alterations and changes will suggest themselves to persons skilled in the art and such alterations and changes will still be within the spirit and scope of the invention.

What we claim as new and desire to secure by Letters Patent of the United States is:

1. A switching circuit for selectively energizing and de-energizing a load from an alternating current source comprising terminals for coupling said switching circuit to said source, means coupling one end of said load to one of said terminals, a first control circuit comprising a first controlled rectifier, said controlled rectifier comprising an anode, a cathode and a control electrode, means for controlling the conductivity of said first controlled rectifier comprising a first impedance network coupled between the anode and cathode electrodes of said first controlled rectifier, said first impedance network comprising a saturable reactor coupled between the cathode and control electrodes of said first controlled rectifier, means for changing said first saturable reactor between a high and a low impedance condition, said first controlled rectifier responsive to said high impedance condition of said first saturable reactor to become conductive, means coupling said first control circuit between the other end of said load and one of said terminals so that said load may be energized in response to one polarity of said source and in response to the operation of said first controlled rectifier, a second control circuit comprising a second controlled rectifier, said second controlled rectifier comprising an anode, a cathode and a control electrode, means for controlling the conductivity of said second controlled rectifier comprising a second impedance network coupled between the anode and cathode electrodes of said second controlled rectifier, said second impedance network comprising a second saturable reactor coupled between the cathode and control electrodes of said second controlled rectifier, means for changing said second saturable reactor between a high impedance and a low impedance condition, said second controlled rectifier responsive to said high impedance condition of said second saturable reactor to become conductive, and means coupling said second control circuit between said other end of said load and one of said terminals so that said load may be energized in response to the opposite polarity of said source and in response to the operation of said second controlled rectifier.

2. A switching circuit for selectively energizing and deenergizing a load from an alternating current source comprising first and second terminals for coupling said switching circuit to said source, means coupling one end of said load to said first terminal, a first control circuit comprising a first controlled rectifier, said controlled rectifier comprising an anode, a cathode and a control electrode, means for controlling the conductivity of said first controlled rectifier comprising a first impedance network coupled between the anode and cathode electrodes of said first controlled rectifier, said first impedance network comprising a saturable reactor coupled between the cathode and control electrodes of said first controlled rectifier, means for changing said first saturable reactor between a high and a low impedance condition, said first controlled rectifier responsive to said high impedance condition of said first saturable reactor to become conductive, means coupling said first control circuit between the other end of said load and said second terminal so that said load may be energized in response to one polarity of said source and in response to the operation of said first controlled rectifier, a second control circuit comprising a second controlled rectifier, said second controlled rectifier comprising an anode, a cathode and a control electrode, means for controlling the conductivity of said second controlled rectifier comprising a second impedance network coupled between the anode and cathode electrodes of said second controlled rectifier, said second impedance network comprising a second saturable reactor coupled between the cathode and control electrodes of said second controlled rectifier, means for changing said second saturable reactor between a high impedance and a low impedance condition, said second controlled rectifier responsive to said high impedance condition of said second saturable reactor to become conductive, and means coupling said second control circuit between said other end of said load and said second terminal so that said load may be energized in response to the opposite polarity of said source and in response to the operation of said second controlled rectifier.

3. A switching circuit for selectively energizing and deenergizing a load from an alternating current source having first and second terminals and a center tap comprising means coupling one end of said load to said center tap, a first control circuit comprising a first controlled rectifier and a secondary winding of a first saturable reactor coupled together so that the condition of said first saturable reactor controls the operation of said first controlled rectifier, means coupling said first control circuit between the other end of said load and said first terminal so that said load may be energized in response to one polarity of said source and in response to the operation of said first controlled rectifier, a second control circuit comprising a second controlled rectifier and a secondary winding of a second saturable reactor coupled together so that the condition of said second saturable reactor controls the operation of said second controlled rectifier, means coupling said second control circuit between said other end of said load and said second terminal so that said load may be energized in response to the opposite polarity of said source and in response to the operation of said second controlled rectifier, and a primary winding coupled to said saturable reactors for controlling the saturation of said saturable reactors.

4. A circuit for selectively energizing and deenergizing a load from an alternating current source comprising terminals for coupling said circuit to said source; means coupling one end of said load to one of said terminals; first and second energizing paths coupled between the other end of said load and said terminals for permitting current to flow through said load in response to one polarity and in response to the opposite polarity of said source; said energizing paths each comprising a controlled rectifier having an anode, a cathode, and a gate electrode, the anode-cathode circuit of said controlled rectifiers respectively providing said energizing paths in response to said controlled rectifiers being conductive, means including a secondary winding of a saturable reactor and a rectifier coupled to said anode, cathode and gate electrodes of said controlled rectifier so that said secondary winding of said saturable reactor normally presents a relatively low shunt impedance to the gate electrode-cathode circuit of said controlled rectifier and thereby renders said controlled rectifier nonconductive; and a primary winding coupled to each of said saturable reactors so that said secondary windings may present a relatively high shunt impedance to said gate electrode-cathode circuits of said controlled rectifiers and thereby render said controlled rectifiers conductive in response to a signal applied to said primary winding and thereby permit current to flow through said load in response to said one polarity and said opposite polarity of said source.

5. A switching circuit for selectively energizing and deenergizing a load from an alternating current source comprising first and second terminals for coupling said switching circuit to said source; means coupling one end of said load to said first terminal; a first control circuit comprising a first controlled rectifier having an anode, a cathode, and a gate electrode, a first saturable reactor having a secondary winding, means coupling said secondary winding of said first saturable reactor in a circuit between said gate electrode and said cathode of said first controlled rectifier, a first rectifier having an anode and a cathode, means coupling said first rectifier in a circuit between said anode and said gate electrode of said first controlled rectifier with said anode of said first rectifier and said anode of said first controlled rectifier at corresponding ends of said circuit; means coupling said first control circuit between the other end of said load and said second terminal so that said load may be energized in response to one polarity of said source and in response to conduction of said first controlled rectifier; a second control circuit comprising a second controlled rectifier having an anode, a cathode, and a gate electrode, a second saturable reactor having a secondary winding, means coupling said secondary winding of said second saturable reactor in a circuit between said gate electrode and said cathode of said second controlled rectifier, a second rectifier having an anode and a cathode, means coupling said second rectifier in a circuit between said anode and said gate electrode of said second controlled rectifier with said anode of said second rectifier and said anode of said second controlled rectifier at corresponding ends of said circuit; means coupling said second control circuit between said other end of said load and said second terminal so that said load may be energized in response to the opposite polarity of said source and in response to conduction of said second controlled rectifier; and a primary winding coupled to each of said saturable reactors for controlling the saturation of said saturable reactors.

6. A circuit for selectively energizing and deenergizing a load from an alternating current source comprising terminals for coupling said circuit to said source; means coupling one end of said load to one of said terminals; first and second energizing paths coupled between the other end of said load and said terminals for permitting current to flow through said load in response to one polarity and in response to the opposite polarity of said source, said energizing paths each comprising a controlled rectifier having an anode, a cathode, and a gate electrode, the anode-cathode circuit of said controlled rectifiers respectively providing said energizing paths in response to said controlled rectifiers being conductive, means including a secondary winding of a saturable reactor and a rectifier coupled to said controlled rectifier so that said secondary winding normally presents a relatively low impedance to render said controlled rectifier nonconductive, and a capacitor coupled to said secondary winding for supplying a current pulse to said controlled rectifier; and a primary winding coupled to each of said saturable reactors so that said secondary windings may present a relatively high impedance to permit said capacitors to charge and supply said current pulses and thereby render said controlled rectifiers conductive in response to a signal applied to said primary winding and thereby permit current to flow through said load in response to said one polarity and said opposite polarity of said source.

7. A switching circuit for selectively energizing and deenergizing a load from an alternating current source comprising first and second terminals for coupling said switching circuit to said source; means coupling one end of said load to said first terminal; a first control circuit comprising a first controlled rectifier having an anode, a cathode, and a gate electrode, a first rectifier having an anode and a cathode, a first saturable reactor having a secondary winding, a first impedance, means coupling said first impedance in a circuit between said gate electrode and said cathode of said first controlled rectifier, means coupling said first rectifier and said secondary winding of said first saturable reactor in a series circuit between said anode and said gate electrode of said first controlled rectifier with said anode of said first rectifier and said anode of said first controlled rectifier at corresponding ends of said series circuit, a first capacitor coupled in parallel with said secondary winding of said first saturable reactor and said first impedance; means coupling said first control circuit between the other end of said load and said second terminal so that said load may be energized in response to one polarity of said source and in response to conduction of said first controlled rectifier; a second control circuit comprising a second controlled rectifier having an anode, a cathode, and a gate electrode, a second rectifier having an anode and a cathode, a second saturable reactor having a secondary winding, a second impedance, means coupling said second impedance in a circuit between said gate electrode and said cathode of said second controlled rectifier, means coupling said second rectifier and said secondary winding of said second saturable reactor in a series circuit between said anode and said gate electrode of said second controlled rectifier with said anode of said second rectifier and said anode of said second controlled rectifier at corresponding ends of said series circuit, a second capacitor coupled in parallel with said secondary winding of said second saturable reactor and said second impedance; means coupling said second control circuit between said other end of said load and said second terminal so that said load may be energized in response to the opposite polarity of said source and in response to conduction of said second controlled rectifier; and a primary winding coupled to each of said saturable reactors for controlling the conduction of said saturable reactors.

8. A circuit for selectively energizing and deenergizing a load from an alternating current source comprising terminals for coupling said circuit to said source; means coupling one end of said load to one of said terminals; first and second energizing paths coupled between the other end of said load and said terminals for permitting current to flow through said load in response to one polarity and in response to the opposite polarity of said source; said energizing paths each comprising a controlled rectifier having an anode, a cathode, and a gate electrode, the anode-cathode circuit of said controlled rectifier providing said energizing path in response to said controlled rectifier being conductive, means including a secondary winding of a saturable reactor coupled to said controlled rectifier so that said secondary winding presents a relatively high shunt impedance to the gate electrode-cathode circuit of said controlled rectifier and thereby renders said controlled rectifier conductive; and a primary winding coupled to each of said saturable reactors so that said secondary windings may present a relatively low shunt impedance to said gate electrode circuits of said controlled rectifiers and thereby render said controlled rectifiers nonconductive in response to a signal applied to said primary winding and thereby prevent current from flowing through said load.

9. A switching circuit for selectively energizing and deenergizing a load from an alternating current source comprising first and second terminals for coupling said switching circuit to said source; means coupling one end of said load to said first terminal; a first control circuit comprising a first controlled rectifier having an anode, a cathode, and a gate electrode, a first impedance, a first saturable reactor having a secondary winding, means coupling said secondary winding of said first saturable reactor and said first impedance in a series between said anode and said cathode of said first controlled rectifier with said secondary winding of said first saturable reactor coupled to said cathode of said first controlled rectifier, means coupling the junction of said first impedance and said secondary winding of said first saturable reactor to said gate electrode of said first controlled rectifier; means coupling said first control circuit between the other end of said load and said second terminal so that said load my be energized in response to one polarity of said source and in response to conduction of said first controlled rectifier; a second control circuit comprising a second controlled rectifier having an anode, a cathode, and a gate electrode, a second impedance, a second saturable reactor having a secondary winding, means coupling said secondary winding of said second saturable reactor and said second impedance in a series circuit between said anode and said cathode of said second controlled rectifier with said secondary winding of said second saturable reactor coupled to said cathode of said second controlled rectifier, means coupling the junction of said second impedance and said secondary winding of said second saturable reactor to said gate electrode of said second controlled rectifier; means coupling said second control circuit between said other end of said load and said second terminal so that said load may be energized in response to the opposite polarity of said source and in response to the conduction of said second controlled rectifier; and a primary winding coupled to each of said saturable reactors for controlling the saturation of said saturable reactors.

10. A circuit for selectively energizing and deenergizing a load from an alternating current source comprising terminals for coupling said circuit to said source; means coupling one end of said load to one of said terminals; first and second energizing paths coupled between the other end of said load and said terminals for permitting current to flow through said load in response to one polarity and in response to an opposite polarity respectively of said source; said energizing paths each comprising a controlled rectifier having an anode, a cathode, and a gate electrode, the anode-cathode circuit of said controlled rectifier providing said energizing path in response to said controlled rectifier being conductive, means including a secondary winding of a saturable reactor coupled to said controlled rectifier so that said secondary winding normally presents a relatively high impedance, and a capacitor coupled to said secondary winding for supplying a current pulse to said controlled rectifier; and a primary winding coupled to each of said saturable reactors so that said secondary windings may present a relatively high impedance to permit said capacitors to charge and supply said current pulses and thereby rended said controlled rectifiers conductive in response to a signal applied to said primary winding and thereby permit current to flow through said load in response to said one polarity and said opposite polarity of said source.

11. A switching circuit for selectively energizing and deenergizing a load from an alternating current source comprising first and second terminals for coupling said switching circuit to said source; means coupling one end of said load to said first terminal; a first control circuit comprising a first controlled rectifier having an anode, a cathode, and a gate electrode, a first saturable reactor having a secondary winding, a first impedance, means coupling said first impedance in a circuit between said gate electrode and said cathode of said first controlled rectifier, means coupling secondary winding of said first saturable reactor in a circuit between said anode and said gate electrode of said first controlled rectifier, a first capacitor coupled in parallel with said secondary winding of said first saturable reactor and said first impedance; means coupling said first control circuit between the other end of said load and said second terminal so that said load may be energized in response to one polarity of said source and in response to conduction of said first controlled rectifier; a second control circuit comprising a second controlled rectifier having an anode, a cathode, and a gate electrode, a second saturable reactor having a secondary winding, a second impedance, means coupling said second impedance in a circuit between said gate electrode and said cathode of said second controlled rectifier, means coupling said secondary winding of said second saturable reactor in a circuit between said anode and said gate electrode of said second controlled rectifier, a second capacitor coupled in parallel with said secondary winding of said second saturable reactor and said second impedance; means coupling said second control circuit between said other end of said load and said second terminal so that said load may be energized in response to the opposite polarity of said source and in response to conduction of said second controlled rectifier; and a primary winding coupled to each of said saturable reactors for controlling the saturation of said saturable reactors.

12. A circuit for selectively energizing and deenergizing a load from an alternating current source comprising terminals for coupling said circuit to said source; means coupling one end of said load to one of said terminals; first and second energizing paths coupled between the other end of said load and said terminals for permitting current to flow through said load in response to one polarity and in response to the opposite polarity of said source; said energizing paths each comprising a controlled rectifier having an anode, a cathode, and a gate electrode, the anode-cathode circuit of said controlled rectifier providing said energizing path in response to said controlled rectifier being conductive, means including a secondary winding of a saturable reactor, a feedback winding of a saturable reactor, and a rectifier coupled to said controlled rectifier so that secondary winding normally presents a relatively low shunt impedance to the gate electrode-cathode circuit of said controlled rectifier and thereby renders said controlled rectifier nonconductive, said feedback winding of each path being coupled to said secondary winding of the other path so that said feedback winding of each path causes said secondary winding of the other path to present a relatively high impedance in response to current flow through said anode-cathode circuit of said controlled rectifiers; and a primary winding coupled to one of said saturable reactors so that said secondary winding of said one saturable reactor may present a relatively high shunt impedance to said gate electrode-cathode circuit of said controlled rectifier and thereby render said controlled rectifier conductive in response to a signal of one polarity applied to said primary winding and thereby permit current to flow through said load in response to both polarities of said source, and so that said secondary winding of said one saturable reactor may present a relatively low shunt impedance to said gate electrode-cathode circuit of said controlled rectifier and thereby render said controlled rectifier nonconductive in response to a signal of the opposite polarity applied to said primary winding.

13. A switching circuit for selectively energizing and deenergizing a load from an alternating current source comprising first and second source terminals for coupling said switching circuit to said source; means coupling one end of said load to said first source terminal; first and second saturable reactors each having a secondary winding and a feedback winding; a first control circuit having a first and second terminals and comprising a first controlled rectifier having an anode, a cathode, and a gate electrode, a first rectifier having an anode and a cathode, means coupling said cathode of said first controlled rectifier to said second terminal of said first control circuit, means coupling said feedback winding of said second saturable reactor between said first terminal of said first control circuit and said anode of said first controlled rectifier, means coupling said first rectifier between said first terminal of said first control circuit and said gate electrode of said first controlled rectifier, means coupling said secondary winding of said first saturable reactor between said gate electrode and said cathode of said first controlled rectifier; means coupling said first terminal of said first control circuit to the other end of said load and for coupling said second terminal of said first control circuit to said second source terminal; a second control circuit having first and second terminals and comprising a second controlled rectifier having an anode, a cathode, and a gate electrode, a second rectifier having an anode and a cathode, means coupling said cathode of said second controlled rectifier to said second terminal of said second control circuit, means coupling said feedback winding of said first saturable reactor between said first terminal of said control circuit and said anode of said second controlled rectifier, means coupling said second rectifier between said first terminal of said second control circuit and said gate electrode of said second controlled rectifier, means coupling said secondary winding of said second saturable reactor between said gate electrode and said cathode of said second controlled rectifier; means coupling said second terminal of said second control circuit to said other end of said load and for coupling said first terminal of said second control circuit to said second source terminal; and a primary winding coupled to each of said saturable reactors for controlling the saturation of said saturable reactors.

14. A circuit for selectively energizing and deenergizing a load from an alternating current source comprising terminals for coupling said circuit to said source; means coupling one end of said load to one of said terminals; first and second energizing paths coupled between the other end of said load and said terminals for permitting current to flow through said load in response to one polarity and in response to opposite polarity of said source; said energizing paths each comprising a controlled rectifier having an anode, a cathode, and a gate electrode, the anode-cathode circuit of said controlled rectifier providing said energizing paths in response to said controlled rectifier being conductive, means including a secondary winding of a saturable reactor, a feedback winding of a saturable reactor, and a rectifier coupled to said controlled rectifier so that said secondary winding normally presents a low impedance, a capacitor coupled to said secondary winding for supplying a current pulse to said controlled rectifier, said feedback winding of each path being coupled to said secondary winding of the other path so that current through said feedback winding of each path causes said secondary winding of the other path to present a relatively high impedance in response to current flow through said anode-cathode circuit of said controlled rectifiers; and a primary winding coupled to one of said saturable reactors so that said secondary winding of said one saturable reactor may present a relatively high shunt impedance and thereby render said controlled rectifier conductive in response to a signal of one polarity applied to said primary winding and thereby permit current to flow through said load in response to both polarities of said source, and so that said secondary winding of said one saturable reactor may present a relatively low shunt impedance and thereby render said controlled rectifier nonconductive in response to a signal of the opposite polarity applied to said primary winding.

15. A switching circuit for selectively energizing and deenergizing a load from an alternating current source comprising first and second source terminals for coupling said switching circuit to said source; means coupling one end of said load to said first source terminal; first and second saturable reactors each having a secondary winding and a feedback winding; a first control circuit having first and second terminals and comprising a first controlled rectifier having an anode, a cathode, and a gate electrode, a first rectifier having an anode and a cathode, a first impedance, a first capacitor, means coupling said first impedance in a circuit between said gate electrode and said cathode of said first controlled rectifier, means coupling said cathode of said first controlled rectifier to said second terminal of said first control circuit, means coupling said feedback winding of said second saturable reactor between said first terminal of said first control circuit and said anode of said first controlled rectifier, means coupling said secondary winding of said first saturable reactor in a circuit with said first rectifier between said anode and said gate electrode of said first controlled rectifier, means coupling said first capacitor in parallel with said secondary winding of said first saturable reactor and said first impedance; means coupling said first terminal of said first control circuit to the other end of said load and for coupling said second terminal of said first control circuit to said second source terminal; a second control circuit having first and second terminals and comprising a second controlled rectifier having an anode, a cathode, and a gate electrode, a second rectifier having an anode and a cathode, a second impedance, a second capacitor, means coupling said second impedance in a circuit between said gate electrode and said cathode of said second controlled rectifier, means coupling said cathode of said second controlled rectifier to said second terminal of said second control circuit, means coupling said feedback winding of said first saturable reactor between said first terminal of said second control circuit and said anode of said second controlled rectifier, means coupling said secondary winding of said second saturable reactor in a circuit with said second rectifier between said anode and said gate electrode of said second controlled rectifier, means coupling said second capacitor in parallel with said secondary winding of said second saturable reactor and said second impedance; means coupling said second terminal of said second control circuit to said other end of said load and for coupling said first terminal of said control circuit to said second source terminal; and a primary winding coupled to one of said saturable reactors for controlling the saturation thereof.

16. A switching circuit for selectively energizing and deenergizing a load from an alternating current source comprising first and second source terminals for coupling said switching circuit to said source; means coupling one end of said load to said first source terminal; first and second controlled rectifiers each having an anode, a cathode, and a gate electrode; first and second saturable reactors each having a secondary winding and a feedback winding; first and second pulse transformer each having a primary winding and a gating winding; means coupling the anode-cathode circuits of said first and second controlled rectifiers between the other end of said load and said second source terminal in opposite polarity conducting manner; means coupling said first and second feedback windings of said saturable reactors in the anode-cathode circuits respectively of said first and second controlled rectifiers; means coupling said first and second gating windings of said pulse transformers across said gate electrode-cathode circuits of said first and second controlled rectifiers respectively; first and second rectifiers; means coupling said first and second rectifiers in series with said secondary windings of said first and second saturable reactors respectively between said first and second source terminals in opposite polarity conducting manner; first and second capacitors; means coupling said primary windings of said first and second pulse transformers in series with said first and second capacitors respectively and in parallel with said secondary windings of said first and second saturable reactors respectively; and a primary winding coupled to one of said saturable reactors for controlling the saturation thereof.

17. A switching circuit for selectively energizing and deenergizing a load from an alternating current source comprising first and second source terminals for coupling said switching circuit to said source; means coupling one end of said load to said first source terminal; first and second controlled rectifiers each having an anode, a cathode, and a gate electrode; first and second saturable reactors each having a secondary winding; first and second pulse transformers each having a primary winding and a gating winding; means coupling the anode-cathode circuits of said first and second controlled rectifiers between the other end of said load and said second source terminal in opposite polarity conducting manner; means coupling said first and second gating windings of said pulse transformers across said gate electrode-cathode circuits of said first and second controlled rectifiers respectively; first and second rectifiers; means coupling said first and second rectifiers in series with said secondary windings of said first and second saturable reactors respectively between said first and second source terminals in opposite polarity conducting manner; first and second capacitors; means coupling said primary windings of said first and second pulse transformers in series with said first and second capacitors respectively and in parallel with said secondary windings of said first and second saturable reactors respectively; and a primary winding coupled to said saturable reactors for controlling the saturation thereof.

18. A switching circuit for selectively energizing and deenergizing a load from an alternating current source comprising first and second source terminals for coupling said switching circuit to said source; means coupling one end of said load to said first source terminal; first and second controlled rectifiers each having an anode, a cathode, and a gate electrode; first and second saturable reactors each having a secondary winding; first and second pulse transformers each having a primary winding and a gate winding; means coupling the anode-cathode circuits of said first and second controlled rectifiers between the other end of said load and said second source terminal in opposite polarity conducting manner; means coupling said first and second gating windings of said pulse transformers across said gate electrode-cathode circuits of said first and second controlled rectifiers respectively; means coupling said secondary windings of said first and second saturable reactors respectively between said first and second source terminals; first and second capacitors; means coupling said primary windings of said first and second pulse transformers in series with said first and second capacitors respectively and in parallel with said secondary windings of said first and second saturable reactors respectively; and a primary winding coupled to said saturable reactors for controlling the saturation thereof.

19. A circuit for energizing a load from an alternating current source for a predetermined time comprising terminals for coupling said circuit to said source; means coupling one end of said load to one of said terminals; a control circuit comprising a controlled rectifier having an anode, a cathode, and a gate electrode; means coupling the anode-cathode circuit of said controlled rectifier between the other end of said load and one of said terminals; an impedance coupled across the gate electrode-cathode circuit of said controlled rectifier; a first saturable reactor having at least one winding and means for resetting said one winding; means including said one winding and said impedance coupled to said gate electrode of said controlled rectifier and coupled between said other end of said load and one of said terminals, a capacitor coupled in parallel with said one winding and said impedance for supplying a current pulse to said controlled rectifier; and means coupled in parallel with said capacitor for controlling the shunt impedance present on said capacitor and thereby rendering said controlled rectifier conductive for predetermined lengths of time.

20. The circuit defined in claim 19 wherein said last means includes a saturable reactor.

21. In combination, a source of voltage, a load circuit, a first semiconductor PNPN gate controlled device, means for applying voltage from said source to said load circuit comprising said first device, a first source of control signals, means for blocking and unblocking conduction of said first device to control the application of said voltage to said load circuit comprising a first control circuit coupled to said voltage source, said first control circuit comprising a magnetic circuit coupled to a gate electrode of said first device and responsive to voltage from said voltage source to exhibit a low value of impedance sufficient to block conduction of said first device and responsive to signals from said first source to exhibit a high value of impedance sufficient to enable conduction of said first device.

22. In combination, a source of an alternating voltage, a load circuit, a first semiconductor PNPN gate controlled device, means for applying voltage of one polarity from said source to said load circuit comprising said first device, a first source of control signals, means for blocking and unblocking conduction of said first device to control the application of said voltage to said load circuit comprising a first control circuit coupled to said voltage source, said first control circuit comprising a magnetic circuit coupled to a gate electrode of said first device and responsive to voltage of one polarity from said voltage source to exhibit a low value of impedance sufficient to block conduction of said first device and responsive to signals from said first source to exhibit a high value of impedance sufficient to enable conduction of said first device.

23. In combination, a source of an alternating voltage, a load circuit, a first semiconductor PNPN gate controlled device, a second semiconductor PNPN gate controlled device, means for applying voltage of one polarity from said source to said load circuit comprising said first device, means for applying voltage of the opposite polarity from said source to said load circuit comprising said second device, a first source of control signals, a second source of control signals, means for blocking and unblocking conduction of said first device to control the application of said voltage to said load circuit comprising a first control circuit coupled to said voltage source, means for blocking and unblocking conduction of said second device to control the application of said voltage to said load circuit comprising a second control circuit coupled to said voltage source, said first control circuit comprising a magnetic circuit coupled to a gate electrode of said first device and responsive to voltage of one polarity from said voltage source to exhibit a low value of impedance sufficient to block conduction of said first device and responsive to signals from said first source to exhibit a high value of impedance sufficient to enable conduction of said first device, said second circuit comprising a magnetic circuit coupled to a gate electrode of said second device and responsive to voltage of the opposite polarity from said voltage source to exhibit a low value of impedance sufficient to block conduction of said second device and responsive to signals from said second source to exhibit a high value of impedance sufficient to enable conduction of said second device.

No references cited.

JOHN F. COUCH, *Primary Examiner.*

K. D. MOORE, *Examiner.*